United States Patent
Seo

(10) Patent No.: US 7,933,071 B2
(45) Date of Patent: Apr. 26, 2011

(54) DUAL LENS OPTICAL SYSTEM AND DIGITAL CAMERA MODULE INCLUDING THE SAME

(75) Inventor: Jung-pa Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/626,681

(22) Filed: Nov. 26, 2009

(65) Prior Publication Data

US 2010/0097707 A1    Apr. 22, 2010

Related U.S. Application Data

(63) Continuation-in-part of application No. 11/974,874, filed on Oct. 16, 2007, now Pat. No. 7,667,897.

(30) Foreign Application Priority Data

Oct. 17, 2006    (KR) .................. 10-2006-0101030
Nov. 23, 2009    (KR) .................. 10-2009-0113356

(51) Int. Cl.
*G02B 15/02*    (2006.01)
*G02B 17/00*    (2006.01)
(52) U.S. Cl. ......... 359/672; 359/676; 359/726; 359/737
(58) Field of Classification Search .......... 359/672–675, 359/676–692, 726–737
See application file for complete search history.

(56) References Cited

U.S. PATENT DOCUMENTS

| 5,940,126 | A | 8/1999 | Kimura |
| 6,532,035 | B1 | 3/2003 | Saari et al. |
| 6,992,699 | B1 | 1/2006 | Vance et al. |
| 2001/0017661 | A1 | 8/2001 | Shono |
| 2009/0051804 | A1 | 2/2009 | Nomura et al. |
| 2009/0122179 | A1 | 5/2009 | Nomura et al. |

FOREIGN PATENT DOCUMENTS

| JP | 02-262632 A | 10/1990 |
| JP | 10-254055 A | 9/1998 |
| JP | 2005-101729 A | 4/2005 |
| JP | 2006-064958 A | 3/2006 |
| JP | 2006-081089 A | 3/2006 |
| KR | 1993-0010597 A | 6/1993 |
| KR | 1995-0007036 B1 | 6/1995 |

OTHER PUBLICATIONS

Office Action established for CN200710180848.7, Jun. 29, 2010.

*Primary Examiner* — Darryl J Collins
(74) *Attorney, Agent, or Firm* — Drinker Biddle & Reath LLP

(57) ABSTRACT

A dual lens optical system including a first optical system and a second optical system includes at least one reflection member to selectively redirect object lights in first and second directions toward a photographing device. The first optical system includes, in order from an object to the photographing device along the optical axis, a first lens group comprising a first reflection member, a second lens group having a negative refractive power, a third lens group having a positive refractive power, a fourth lens group having a positive refractive power, and a fifth lens group having a positive refractive power. The second optical system shares at least one optical element with the first optical system.

16 Claims, 12 Drawing Sheets (WIDE MODE)

US 7,933,071 B2

DUAL LENS OPTICAL SYSTEM AND DIGITAL CAMERA MODULE INCLUDING THE SAME

CROSS-REFERENCE TO RELATED PATENT APPLICATIONS

This application is a continuation-in part of application Ser. No. 11/974,874, filed on Oct. 16, 2007, which claims the benefit of Korean Patent Application No. 10-2006-0101030, filed on Oct. 17, 2006, in the Korean Intellectual Property Office, the disclosure of which is incorporated herein in its entirety by reference.

This application also claims the benefit of Korean Patent Application No. 10-2009-0113356, filed on Nov. 23, 2009, in the Korean Intellectual Property Office, the disclosure of which is incorporated herein in its entirety by reference.

BACKGROUND OF THE INVENTION

1. Field of the Invention

The present invention relates to a dual lens optical system and a digital camera module including the same, and more particularly, to a dual lens optical system integrally employing a plurality of optical systems to selectively photograph light indicating images of different objects (hereinafter, referred to as the object light), and a digital camera module including the dual lens optical system.

2. Description of the Related Art

As the size and thickness of digital cameras have been decreased, most cameras employ a refractive optical system to cope with the trend. Also, many digital cameras employ a zoom optical system to improve convenience. However, as the size and thickness of the digital camera decreases, the inner space of the digital camera decreases as well so that a focal length may be limited by using the zoom optical system only, that is, there is a limit in increasing an optical zoom magnification ratio. Thus, there is a demand to simultaneously employ a wide single focus mode lens with the zoom optical system. However, since two sensors are needed for two optical systems, the volume and manufacturing cost of a digital camera increase.

As the use of mobile communications devices becomes popular, a demand not only for a basic communications function but for related additional functions increases. Also, a demand for mobile communications devices having a wireless Internet communications function or digital camera function increases. Recently, mobile communications devices, such as camera phones capable of taking a picture and making a video call by combining the wireless Internet communications function and the digital camera function, have been introduced.

The mobile communications device is equipped with two camera modules, that is, one for videotelephony and the other for general image photography. This is because, in the videotelephony and the general image photography, objects are located at the opposite sides with respect to the screen of a mobile communications device. To incorporate the two camera modules, two optical systems and two image sensors are needed. Furthermore, to realize high pixel and high performance camera modules according to the user's demands, the manufacturing cost of the mobile communications device increase.

SUMMARY OF THE INVENTION

To solve the above and/or other problems, according to an aspect of the present invention, there is provided a dual lens optical system including a first optical system and a second optical system, which includes at least one reflection member to selectively redirect object lights in first and second directions toward a photographing device. The first optical system includes, in order from an object to the photographing device along the optical axis, a first lens group comprising a first reflection member, a second lens group having a negative refractive power, a third lens group having a positive refractive power, a fourth lens group having a positive refractive power, and a fifth lens group having a positive refractive power. The second optical system shares at least one optical element with the first optical system.

The first lens group may have either a positive or negative refractive power.

During zooming from a wide mode to a tele mode, the first and third lens groups may be fixed, the second lens group may be moved toward the photographing device, and the fourth and fifth lens groups may be moved toward the object.

The at least one optical element may be at least one optical element of the first lens group, the second lens group, the third lens group, the fourth lens group, the fifth lens group, and the photographing device of the first optical system and, in the second optical system, the object light in the second direction may be redirected by the first reflection member toward the photographing device. The first reflection member may include a first surface and a second surface opposing each other and the first and second directions may be opposite to each other on the same axis. The first reflection member, at a first position, may redirect the object light in the first direction toward the photographing device at the first surface and block the object light in the second direction at the second surface and, at a second position, may redirect the object light in the second direction toward the photographing device at the first surface and block the object light in the first direction at the second surface. The first reflection member may be movable between the first position and the second position.

The second optical system may include a second reflection member that redirects the object light in the second direction toward the photographing device.

The at least one optical element may be the third lens group, the fourth lens group, the fifth lens group, and the photographing device of the first optical system, and the second optical system may include the second reflection member that redirects the object light in the second direction toward the photographing device. The second optical system may include, in order from the object to the photographing device along an optical axis, the second reflection member, the first lens group comprising the third lens group of the first optical system, the second lens group having a positive refractive power of the first optical system, and the third lens group having a positive refractive power of the first optical system.

The first lens group may have a negative refractive power. The first and second directions may be in correspondingly opposite. The first and second directions may face in correspondingly same directions. The second reflection member may be selectively moved between a third position and a fourth position to allow object light incident in the second direction to be formed on the photographing device.

The dual lens optical system may further include a lens cover that is movably arranged in front of the first lens group of the second optical system. At the third position, the object light incident in the second direction may be blocked by the lens cover and object light incident in the first direction may be redirected by the first reflection member and formed on the photographing device. At the fourth position, the object light incident in the second direction may be redirected by a first surface of the second reflection member to be formed on the photographing device and the object light incident in the first direction may be blocked by a second surface of the second reflection member.

At the third position, the object light incident in the second direction may be blocked by a second surface of the second reflection member and the object light incident in the first direction may be redirected by the first reflection member and formed on the photographing device. At the fourth position, the object light incident in the second direction may be redirected by a first surface of the second reflection member to be formed on the photographing device and the object light incident in the first direction may be blocked by the second surface of the second reflection member.

The first and second optical systems may share at least one lens group for auto focusing (AF).

According to another aspect of the present invention, a digital camera module includes the first optical system and the second optical system, in which the first optical system is used for a general photographing mode and the second optical system is used for a self image photographing mode or a video call mode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
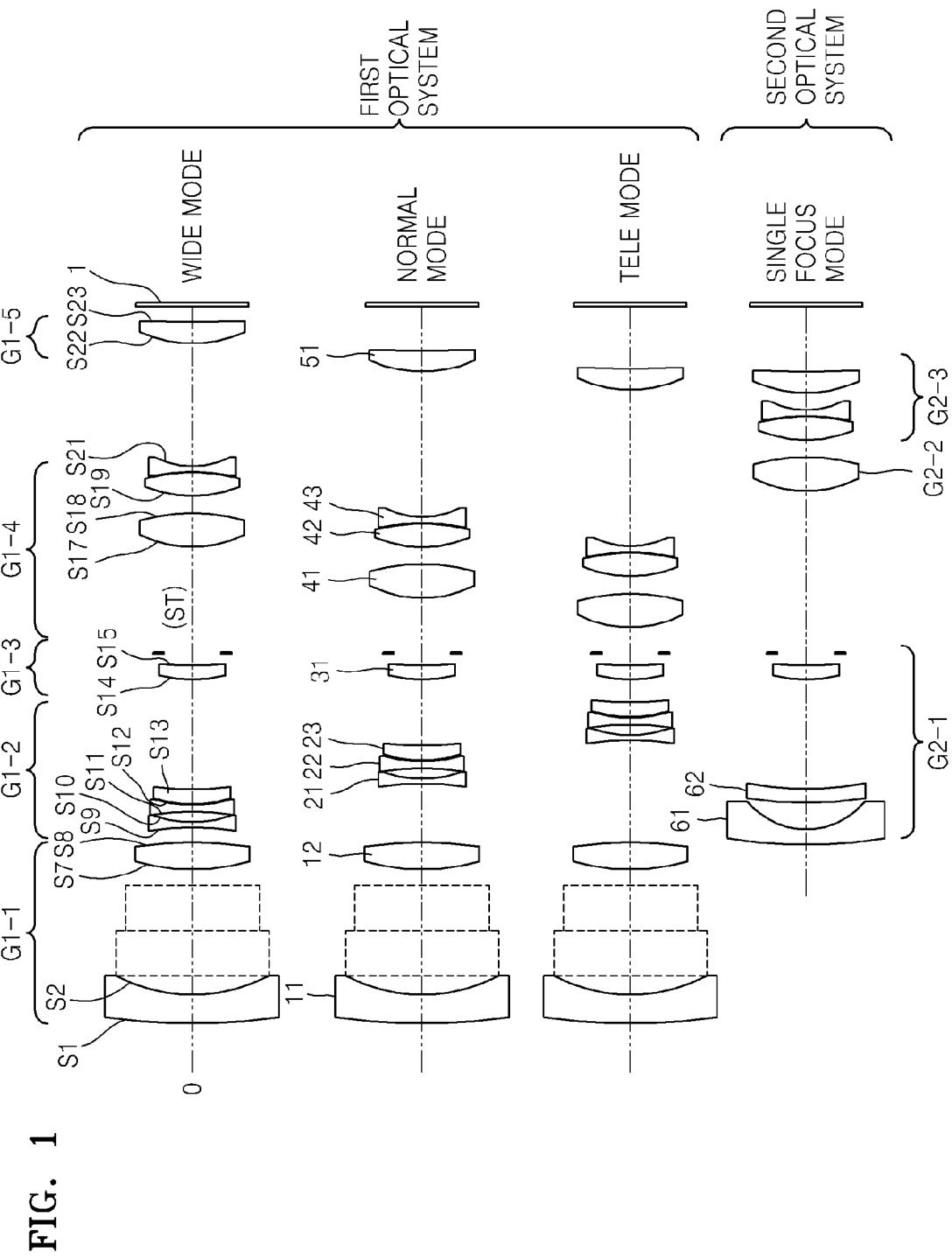
FIG. 1 schematically illustrates dual lens optical systems according to embodiments of the present invention, operating respectively in a wide mode, a normal mode, a tele mode, and a single focus mode for simulation.
Figure 2:
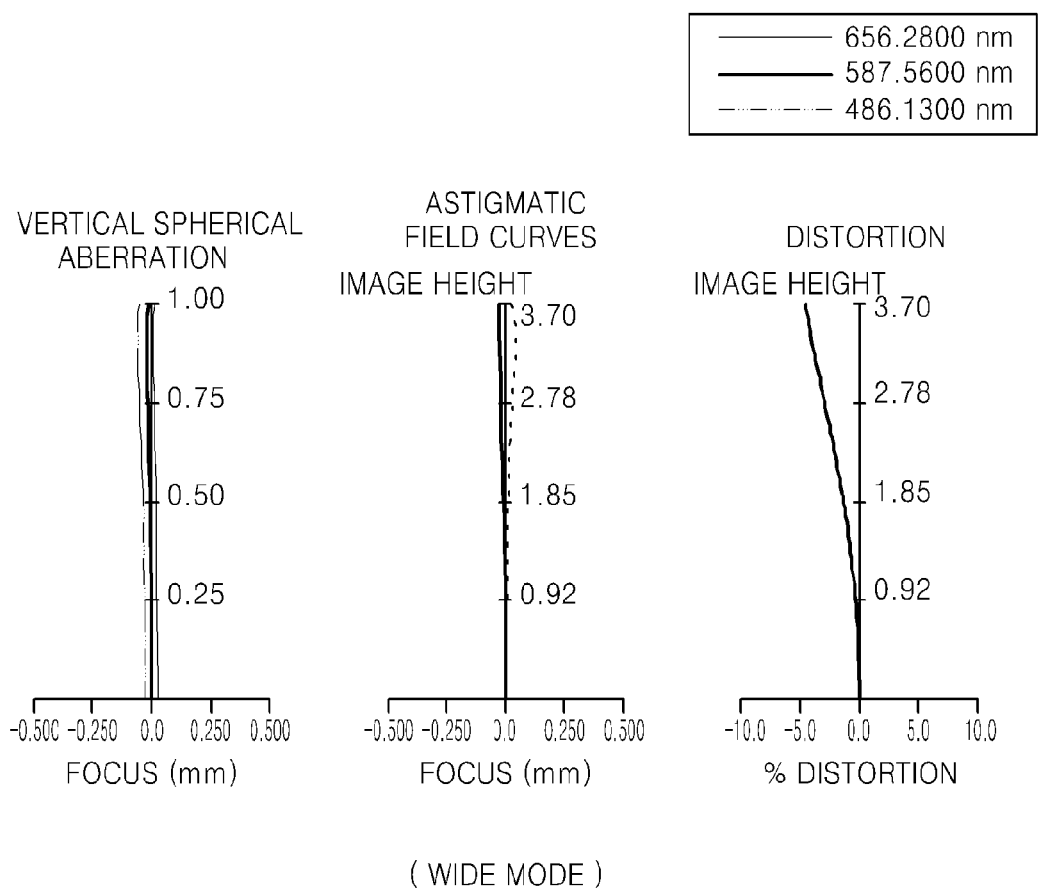
FIG. 2 is aberration graphs of the dual lens optical system of FIG. 1 in the wide mode.
Figure 3:
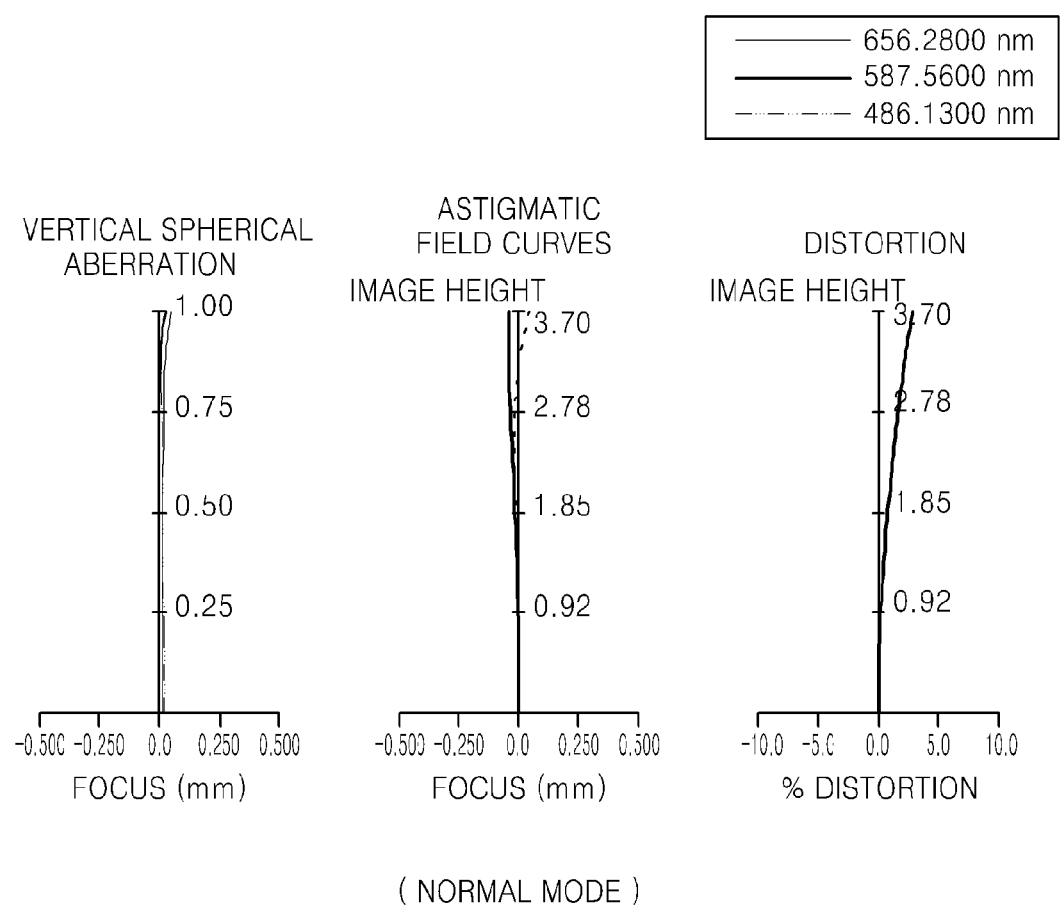
FIG. 3 is aberration graphs of the dual lens optical system of FIG. 1 in the normal mode.
Figure 4:
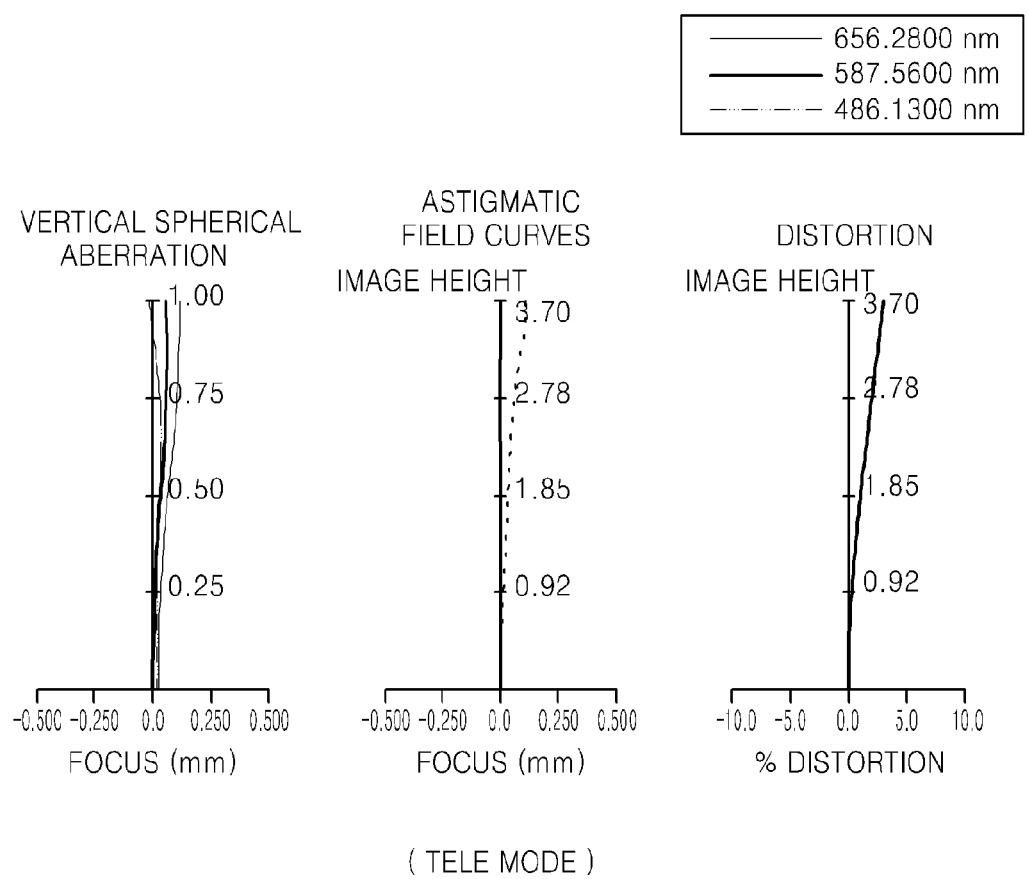
FIG. 4 is aberration graphs of the dual lens optical system of FIG. 1 in the tele mode.
Figure 5:
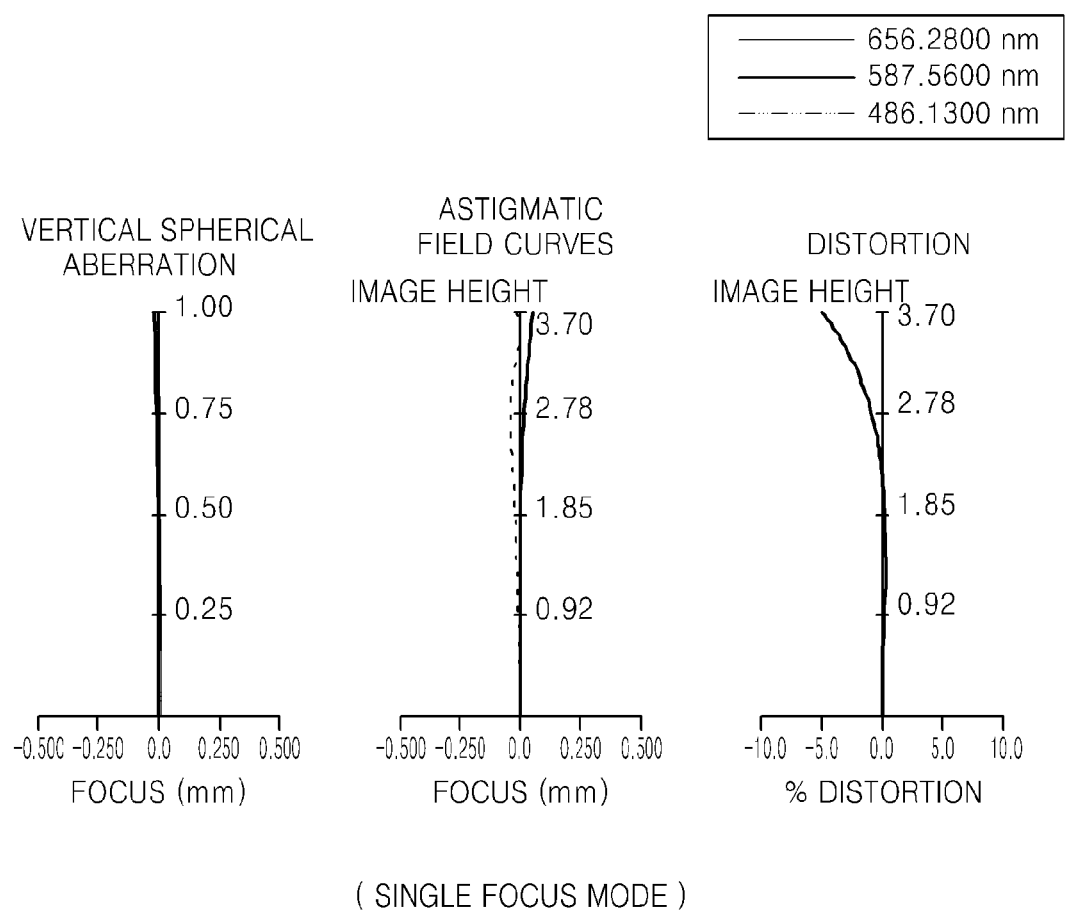
FIG. 5 is aberration graphs of the dual lens optical system of FIG. 1 in the single focus mode.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

A dual lens optical system according to embodiments of the present invention includes a first optical system and a second optical system. In an embodiment, each of the first and second optical systems may be a zoom optical system having a wide mode, a normal mode, and a tele mode. This embodiment includes a dual lens optical system 100 illustrated in FIGS. 6 and 7. In another embodiment, the first optical system may be a zoom optical system having a wide mode, a normal mode, and a tele mode, and the second optical system may be a single focus mode of an ultra wide angle. This embodiment includes dual lens optical systems 200, 300, 400, and 500 illustrated in FIGS. 8-11.

FIG. 1 schematically illustrates dual lens optical systems according to embodiments of the present invention, operating respectively in a wide mode, a normal mode, a tele mode, and a single focus mode for simulation.

Figure 6:
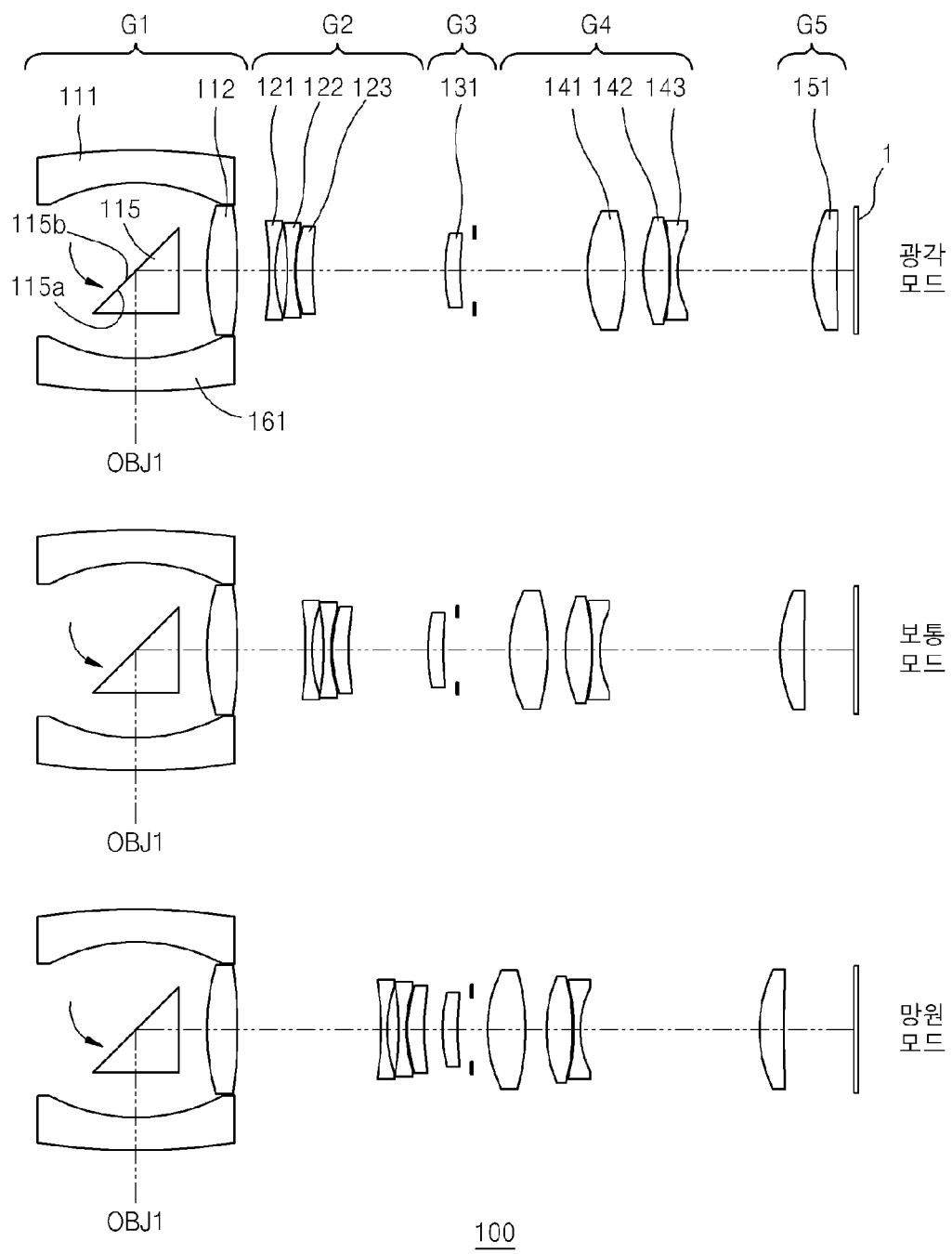
FIG. 6 schematically illustrates a dual lens optical system according to an embodiment of the present invention in the first optical mode.
Figure 7:
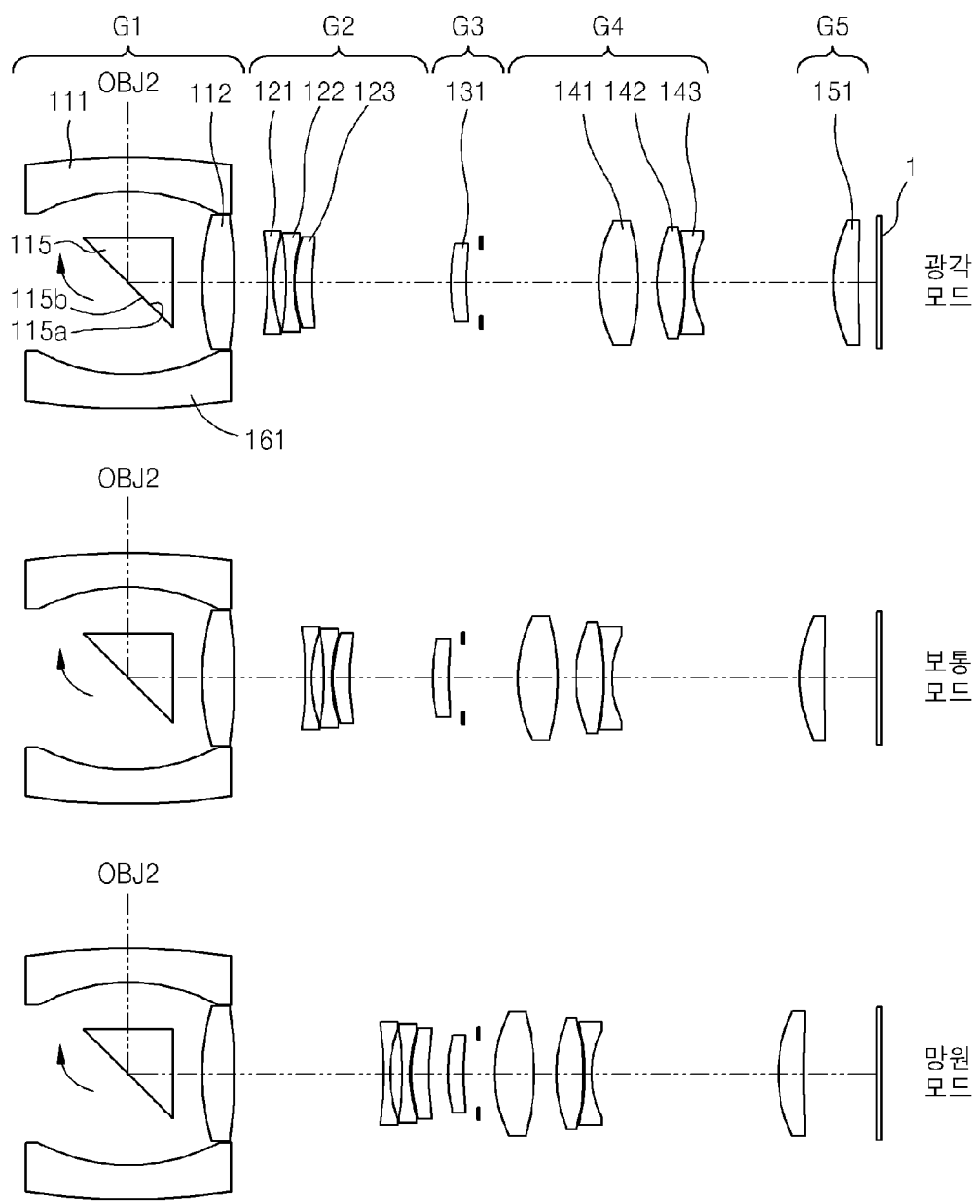
FIG. 7 schematically illustrates a dual lens optical system according to an embodiment of the present invention in the second optical mode.

The first and second optical systems of the dual lens optical system 100 illustrated in FIGS. 6 and 7, and the first optical system of the dual lens optical systems 200, 300, 400, and 500 illustrated in FIGS. 8-11, each are formed of five lens groups G1-1, G1-2, G1-3, G1-4, and G1-5 as illustrated in FIG. 1. The first optical system includes a first lens group G1-1, a second lens group G1-2, a third lens group G1-3, a fourth lens group G1-4, and a fifth lens group G1-5 along an optical axis, from an object to an image sensor (or a photographing device).

The first lens group G1-1 may include a first incident lens 161 and a convex lens 112. The first incident lens 161 may be a negative meniscus lens. The convex lens 112 may be a double-convex lens. The first lens group G1-1 may have a positive refractive power. However, the present invention is not limited thereto and the first lens group G1-1 may have a negative refractive index. The first lens group G1-1 is fixed during zooming from the wide mode to the tele mode.

The second lens group G1-2 has a negative refractive power. The second lens group G1-2 may include three units of lenses 121, 122, and 123. The three lens units may be two double-concave lenses 121 and 122 and one positive meniscus lens 123. The second lens group G1-2 moves from the object toward the image sensor during the zooming from the wide mode to the tele mode.

The third lens group G1-3 has a positive refractive power. The third lens 131 may be a positive meniscus lens. The third lens 131 is fixed during the zooming from the wide mode to the tele mode. An aperture ST is arranged between the third lens group G1-3 and the fourth lens group G1-4.

The fourth lens group G1-4 has a positive refractive power. The fourth lens group G1-4 may include three lens units 141, 142, and 143. The three lens units may be two double-convex lenses 141 and 142 and one positive concave lens 143. The fourth lens group G1-4 moves from the image toward the object during the zooming from the wide mode to the tele mode.

The fifth lens group G1-5 has a positive refractive power. The fifth lens group G1-5 may be a positive meniscus lens 151. The fifth lens group G1-5 moves from the image toward the object during the zooming from the wide mode to the tele mode. Although the fifth lens group G1-5 may perform an auto focusing function, the protection scope of the present invention is not limited thereto and the fourth lens group G1-4 may perform the auto focusing function.

The second optical system in the dual lens optical system of FIGS. 8-11 may include three lens units as illustrated in FIG. 1. For example, the second optical system may include a first lens group G2-1, a second lens group G2-2, and a third lens group G2-3 sequentially along the image axis from the object toward the image. The second optical system is a single focus mode optical system.

The first lens group G2-1 of the second optical system may include two units of negative meniscus lenses 61 and 62 and one unit of a positive meniscus lens 31. The second incident lens 61 is a negative meniscus lens located closest to the object. The positive meniscus lens 31 of the first lens group G2-1 of the second optical system, which is located closest to the image, is the same as that of the third lens group G1-3 of the first optical system. The first lens group G2-1 of the second optical system has a negative refractive power. However, the protection scope of the present invention is not limited thereto and the first lens group G2-1 of the second optical system may have a positive refractive power.

The second lens group G2-2 of the second optical system is the fourth lens group G1-4 of the first optical system. Also, the third lens group G2-3 of the second optical system is the fifth lens group G1-5 of the first optical system. That is, the first and second optical systems share one or more optical elements. The optical elements to be shared will be described later referring to the embodiments illustrated in FIGS. 6-11.

Although in the above description the second optical system includes three lens groups G2-1, G2-2, and G2-3, the second optical system may include fourth lens groups. In other words, assuming that the second incident lens 61 and the negative meniscus lens 62 make the first lens group and the positive meniscus lens 31 makes the second lens group, the second optical system may be formed of fourth lens groups. In case of the fourth lens groups, the first lens group may have a negative refractive power and the second lens group may have a positive refractive power.

Table 1 shows design data of the dual lens optical system of FIG. 1.

In Table 1, "R" denotes a radius of curvature, "Dn" denotes the thickness of a lens at the center thereof or the distance between lenses, "Nd" denotes a refractive index, and "Vd" denotes the Abbe number. The mark "*" in the item "Lens surface" denotes aspherical surface.

The dual lens optical systems according to embodiments of the present invention including at least one aspherical lens may correct spherical aberration. The definition of the aspherical surface according to the embodiment of the present invention is as follows.

Assuming that a direction along the optical axis toward a photographing device 1 is an x-axis and a direction perpendicular to the optical axis, that is, a direction in which the object light is incident through the incident lens 111 or 211 is a y-axis, and that the direction in which a light ray proceeds is defined to be positive, the aspherical surface may be expressed as follows.

$$x = \frac{cy^2}{1 + \sqrt{1 - (K+1)c^2h^2}} + Ah^4 + Bh^6 + Ch^8 + Dh^{10} \quad \text{[Equation 1]}$$

In Equation 1, "x" denotes a distance from the apex of a lens in the optical axis direction, "y" denotes a distance from the optical axis in a direction perpendicular to the optical axis, "K" denotes a conic constant, "A", "B", "C", and "D" denote coefficients of an aspherical surface, and "c" denotes the reciprocal (1/R) of a radius of curvature at the apex of a lens.

TABLE 1

| Lens surface | First optical system | | | | Lens surface | Second optical system | | | |
| --- | --- | --- | --- | --- | --- | --- | --- | --- | --- |
| | R | Dn | Nd | Vd | | R | Dn | Nd | Vd |
| OBJ1 | INFINITY | INFINITY | | | OBJ2 | INFINITY | INFINITY | | |
| S1 | 61.2649 | 2.0000 | 1.957594 | 22.832500 | S1* | 43.0496 | 1.1000 | 1.804700 | 40.953170 |
| S2 | 13.7438 | 1.4490 | | | S2* | 4.9324 | 2.0215 | | |
| S3 | INFINITY | 4.0000 | 1.834001 | 37.345100 | S3 | 39.839 | 0.8555 | 1.503339 | 79.903600 |
| S4 | INFINITY | 0.0000 | | | S4 | 22.6592 | 10.0234 | | |
| S5 | INFINITY | 4.0000 | 1.834001 | 37.345100 | | | | | |
| S6 | INFINITY | 1.0000 | | | | | | | |
| S7 | 16.2962 | 2.1525 | 1.740889 | 50.745500 | | | | | |
| S8* | −19.2507 | D1 | | | | | | | |
| S9 | −27.2263 | 0.5000 | 1.785610 | 37.758400 | | | | | |
| S10 | 8.7335 | 1.0000 | | | | | | | |
| S11 | −14.4598 | 0.5000 | 1.496997 | 81.608400 | | | | | |
| S12 | 8.1504 | 1.3778 | 2.000600 | 25.458 | | | | | |
| S13 | 20.4376 | D2 | | | | | | | |
| S14* | 12.6521 | 1.1334 | 1.697852 | 30.353400 | S14 | 12.6521 | 1.1334 | 1.697852 | 30.353400 |
| S15 | 35.46 | 1.0000 | | | S15 | 35.46 | 1.0000 | | |
| ST: | INFINITY | D3 | | | ST: | INFINITY | D3 | | |
| S17* | 8.9522 | 2.9431 | 1.512122 | 77.721500 | S17* | 8.9522 | 2.9431 | 1.512122 | 77.721500 |
| S18* | −11.7763 | 1.0170 | | | S18* | −11.7763 | 1.0170 | | |
| S19 | 9.0098 | 2.0047 | 1.496997 | 81.608400 | S19 | 9.0098 | 2.0047 | 1.496997 | 81.608400 |
| S20 | −17.6242 | 0.5000 | 1.888289 | 29.145800 | S20 | −17.6242 | 0.5000 | 1.888289 | 29.145800 |
| S21 | 7.2792 | D4 | | | S21 | 7.2792 | D4 | | |
| S22* | 9.7849 | 1.8556 | 1.531200 | 56.512700 | S22* | 9.7849 | 1.8556 | 1.531200 | 56.512700 |
| S23* | 318.899 | | | | S23* | 318.899 | | | |

Table 2 shows the aspherical coefficients.

TABLE 2

| Lens surface | K | A | B | C | D |
|---|---|---|---|---|---|
| S1 | 14.99052300 | 4.91352000E−04 | −1.95070000E−05 | 2.94047000E−07 | −2.45030000E−09 |
| S2 | −0.32420800 | −1.63929000E−04 | 1.10196000E−05 | −2.15697000E−06 | 1.25642000E−08 |
| S8 | −2.63573300 | 4.47304000E−05 | −3.78725000E−08 | −1.06129000E−08 | 2.71610000E−10 |
| S14 | −6.56454800 | 2.86020000E−04 | −1.64149000E−05 | 2.01429000E−06 | −1.46820000E−07 |
| S17 | 0.10798000 | −1.95898000E−04 | 1.00752000E−05 | −5.76614000E−07 | 2.07411000E−08 |
| S18 | −2.67347200 | 6.84530000E−05 | 1.09312000E−05 | −5.46968000E−07 | 2.12864000E−08 |
| S22 | −1.00000000 | 2.41023000E−04 | 8.22609000E−06 | −5.00252000E−07 | −1.37695000E−08 |
| S23 | 5266.58534300 | 3.22176000E−04 | −1.25792000E−06 | −3.90649000E−07 | −2.25821000E−08 |

Table 3 shows data about variable distances during zooming.

TABLE 3

| | Wide Mode | Normal Mode | Tele Mode | Single focus mode |
|---|---|---|---|---|
| EFL | 6.63 | 12.70 | 24.71 | 4.14 |
| 2ω | 60.65° | 31.62° | 16.55° | 86.47° |
| Fno | 3.77 | 4.54 | 5.02 | 3.27 |
| D1 | 1.00000 | 4.93511 | 8.99989 | |
| D2 | 9.00000 | 5.06520 | 1.00020 | |
| D3 | 7.60200 | 3.45650 | 1.00000 | 11.33750 |
| D4 | 9.16370 | 12.27990 | 13.46560 | 1.11260 |

In Table 3, "EFL" denotes a synthetic focal distance of the whole lens system,

"Fno" denotes an F number, "2ω" denotes a viewing angle, "D1" denotes the distance between the first lens group G1-1 and the second lens group, "D2" denotes the distance between the second lens group G1-2 and the third lens group, "D3" denotes the distance between the third lens group G1-3 and the fourth lens group G1-4, and "D4" denotes the distance between the fourth lens group G1-4 and the fifth lens group G1-5.

FIGS. 2-5 illustrate spherical aberration, astigmatic field curves, and distortion of the dual lens optical system of FIG. 1, respectively, in the wide mode, the normal mode, the tele mode, and the single focus mode. A detailed embodiment employing the dual lens optical system of FIG. 1 is described below.

First, FIG. 6 schematically illustrates a dual lens optical system 100 according to an embodiment of the present invention in a first optical mode. Referring to FIG. 6, the first and second optical systems share all optical elements except for the incident lenses 161 and 111. That is, the first and second optical systems share a first reflection member 115 and the double convex lens 112 of the first lens group G1, the second through fifth lens groups G2, G3, G4, and G5, and the photographing device 1. Thus, the first and second optical systems are zoom optical systems.

In the first optical mode, the first optical system refracts an object light OBJ1 coming through the first incident lens 161 in one direction, by 90° at the first reflection member 115, to proceed toward the photographing device 1. For example, in a digital camera or a camera phone, the first optical mode may be used by a photographer to photograph other object by using the first optical system.

In the meantime, the second optical mode of FIG. 7 may be used when the photographer takes a self image or makes a video call by using the second optical system. This is because the second optical system may photograph an object light OBJ2 coming through a second incident lens 111 in the opposite direction.

In the present embodiment, the switching between the first and second optical modes is accomplished by the rotation of the first reflection member 115. For example, when a reflection surface 115a (a first surface) of the first reflection member 115 faces the first incident lens 161 (a first position) as illustrated in FIG. 6, the light representing image of object (hereinafter, referred to as "the object light") OBJ1 in the one direction travels toward the photographing device 1. In contrast, the object light OBJ2 in the opposite direction is blocked by a second surface 115b of the first reflection member 115.

Since the lens groups and the movements thereof in the wide mode, the normal mode, and the tele mode in the first and second optical systems are the same as those in the wide mode, the normal mode, and the tele mode of FIG. 1, the descriptions thereof will be omitted herein.

Figure 8:
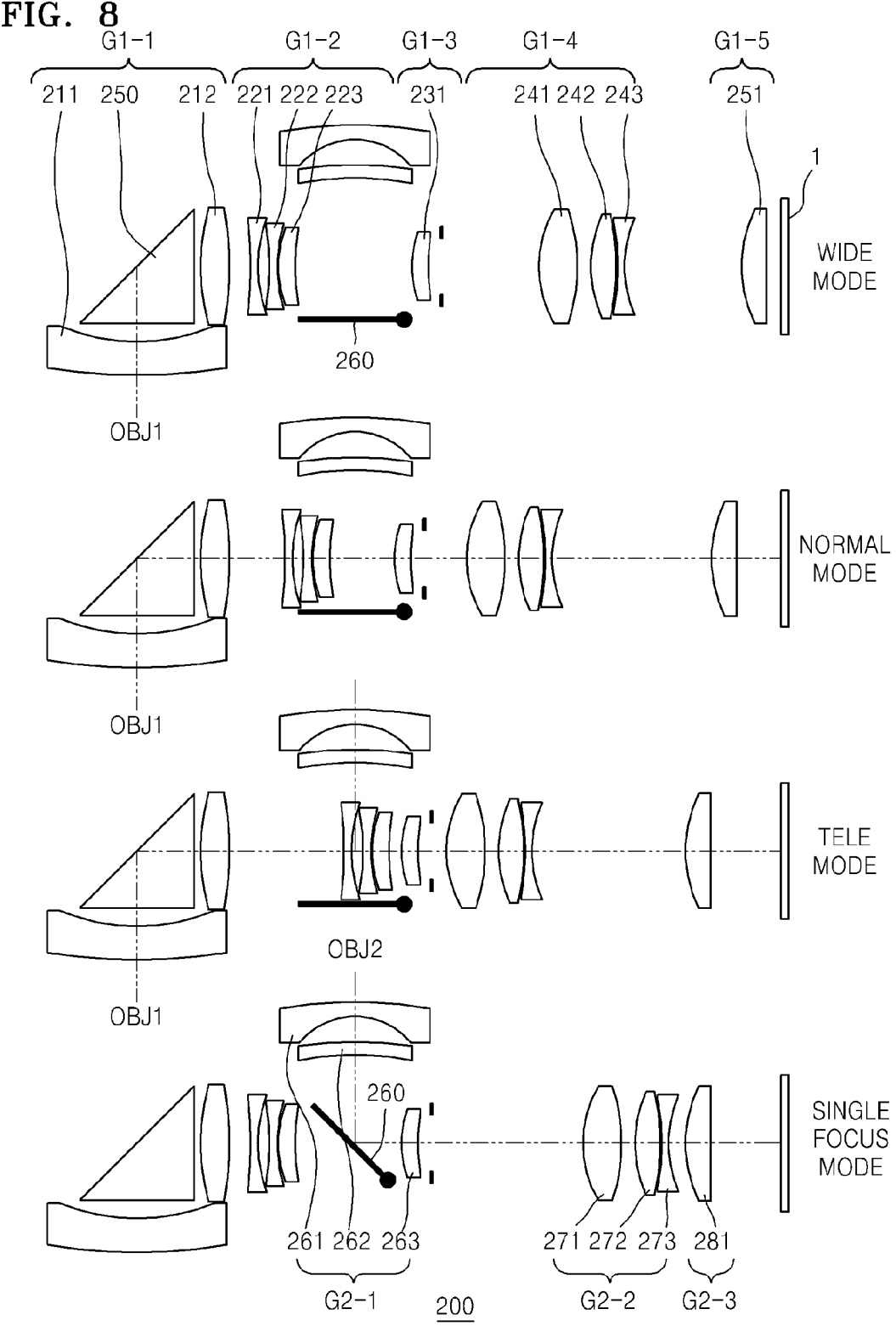
FIG. 8 schematically illustrates a dual lens optical system according to another embodiment of the present invention.

FIG. 8 schematically illustrates a dual lens optical system 200 according to another embodiment of the present invention. In the present embodiment, the first and second optical systems share the third to fifth lens groups G1-3, G1-4, and G1-5 of the first optical system and the photographing device 1.

In the first optical mode, the first optical system refracts the object light OBJ1 coming through a first incident lens 211 in one direction, by 90° at a first reflection member 250, to proceed toward the photographing device 1. Also, the second optical system blocks the object light OBJ2 from coming in the opposite direction by using a lens cover (not shown). For example, in a digital camera or a camera phone, the first optical mode may be used by a photographer to photograph other object by using the first optical system. The first optical system is a zoom optical system because the first optical system includes the second lens group and the fourth lens group G1-2, G1-3, and G1-4 which are zoom lens groups.

The second optical system includes the first lens group G2-1, the second lens group G2-2, and the third lens group G2-3. The second lens group G2-2 and the third lens group G2-3 of the second optical system are shared by the first optical system. Also, a positive meniscus lens 263 of the first lens group G2-1 of the second optical system is shared by the first optical system. A second reflection member 260 is pivotably arranged in the middle of the first lens group G2-1 of the second optical system.

The first optical mode is switched to the second optical mode as the second reflection member 260 pivots by 45°. In the second optical mode, the object light OBJ2 coming through a second incident lens 261 is refracted by 90° at the second reflection member 260 to proceed toward the photographing device 1. Also, the object light OBJ1 coming through the first incident lens 211 is blocked by the second reflection member 260. Thus, in the second optical mode, a photographer may directly photograph oneself while watching one's own image.

Figure 9:
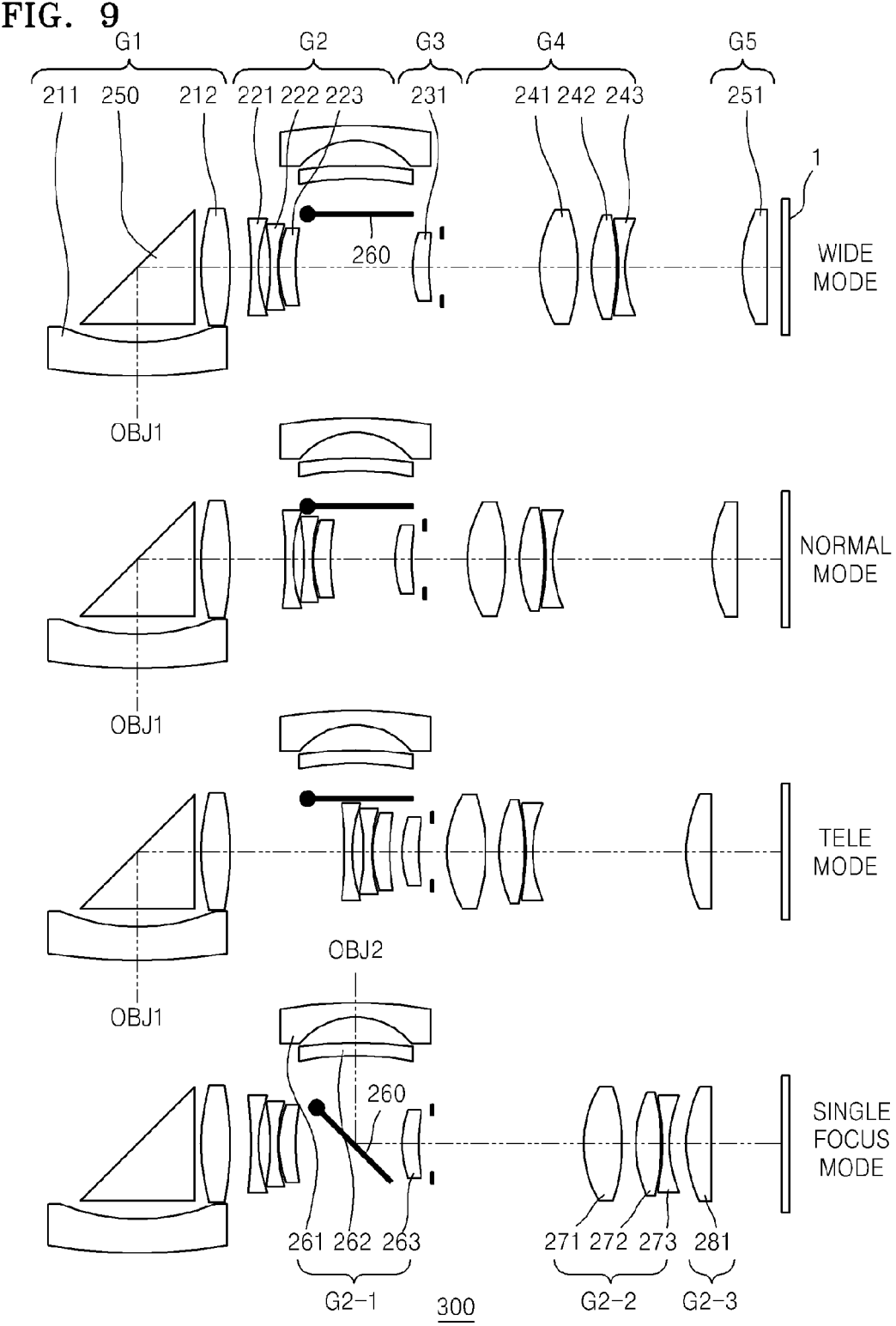
FIG. 9 schematically illustrates a dual lens optical system according to another embodiment of the present invention.

FIG. 9 schematically illustrates a dual lens optical system 300 according to another embodiment of the present invention. In the present embodiment, the second reflection member 260 is located close to the second incident lens 261, which is different from the embodiment of FIG. 8. In the first optical mode, since the second reflection member 260 blocks the object light OBJ2 coming in the opposite direction, a separate lens cover is not needed.

Figure 10:
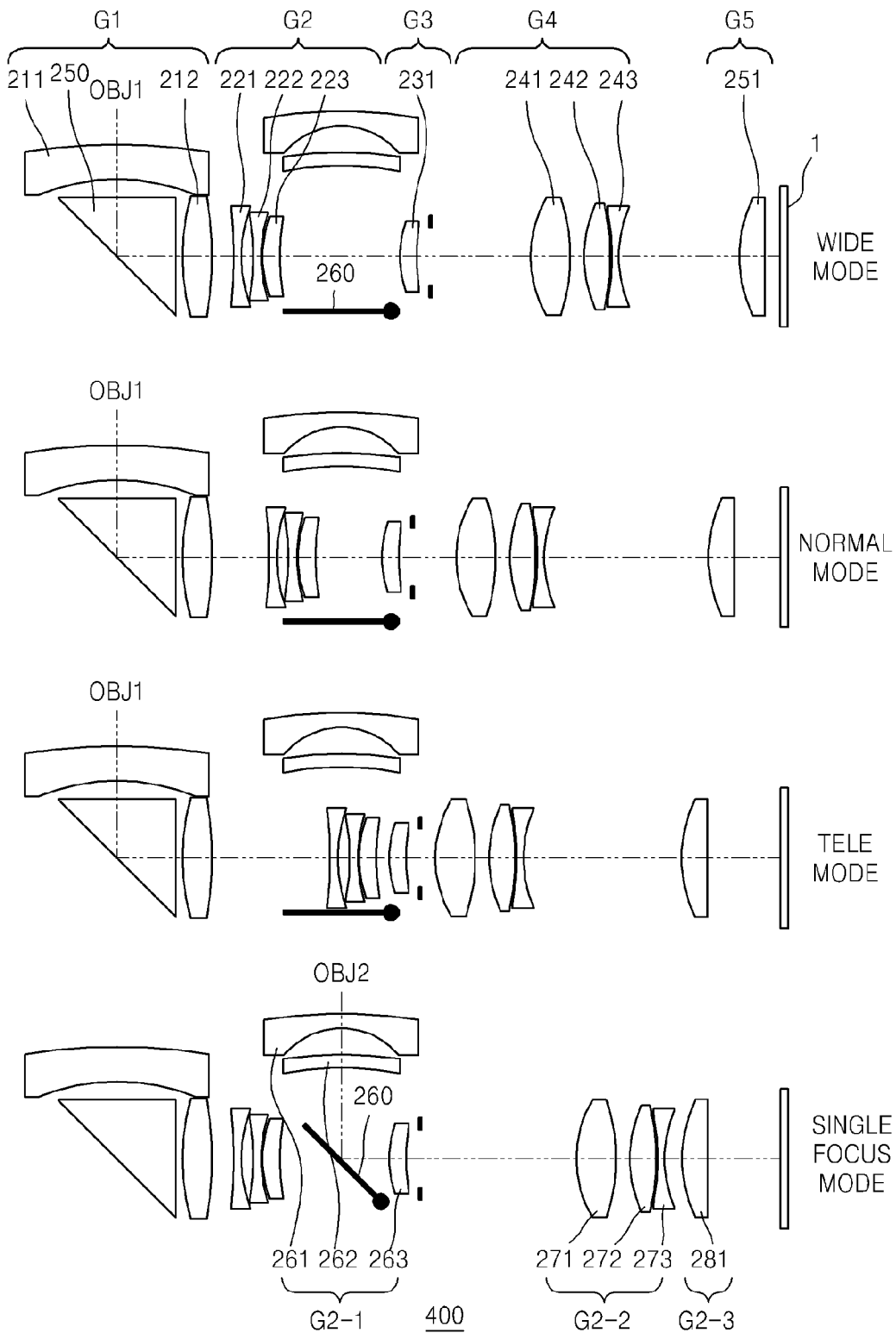
FIG. 10 schematically illustrates a dual lens optical system according to another embodiment of the present invention.

FIG. 10 schematically illustrates a dual lens optical system 400 according to another embodiment of the present invention. The present embodiment is different from the embodiment of FIG. 8 in that the object lights OBJ1 and OBJ2 are respectively incident on the first and second incident lenses 211 and 261 in the same direction. The first optical system is a zoom optical system and the second optical system is a single focus mode optical system. The focal length of the single focus mode optical system of the second optical system is shorter than the focal length in the wide mode of the first optical system, which is an ultra wide mode. Thus, a compact camera may secure a wide range of a focal length.

Figure 11:
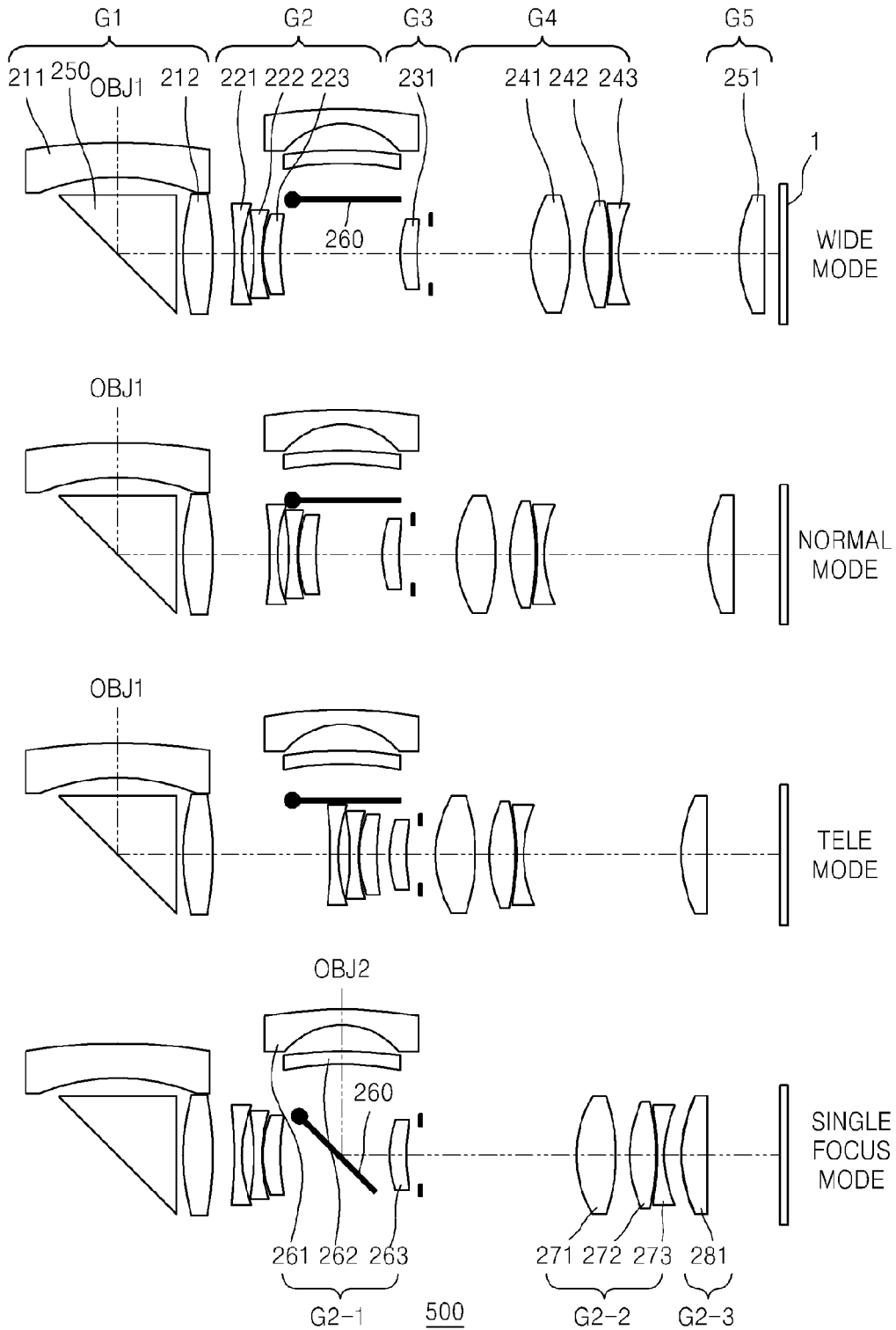
FIG. 11 schematically illustrates a dual lens optical system according to another embodiment of the present invention.

FIG. 11 schematically illustrates a dual lens optical system 500 according to another embodiment of the present invention. The present embodiment is different from the embodiment of FIG. 8 in that the second reflection member 260 is located close to the second incident lens 261. In the first optical mode, since the second reflection member 260 blocks the object light OBJ2 coming in the opposite direction, a separate lens cover is not needed.

Although, in the dual lens optical systems 200, 300, 400, and 500 respectively illustrated in FIGS. 8-11, a reflection mirror is illustrated as the second reflection member 260, the protection scope of the present invention is not limited thereto. For example, a prism capable of moving between the first optical mode and the second optical mode may be used as the second reflection member 260.

The photographing device 1 converts received light indicating an image of the object to an electric signal, and a charge coupled device (CCD), or a complementary metal oxide semiconductor (CMOS) may be employed therefor.

The above-described structures of lenses forming the first lens group to the fifth lens group are exemplary. The number or type of lens units may be appropriately changed, within the claimed range of the present invention, by those skilled in the art considering the optical performance or aberration.

The above-described dual lens optical systems 100, 200, 300, 400, and 500 may be employed as a digital camera module in a digital camera or a mobile communications device, for example, camera phones.

Figure 12:
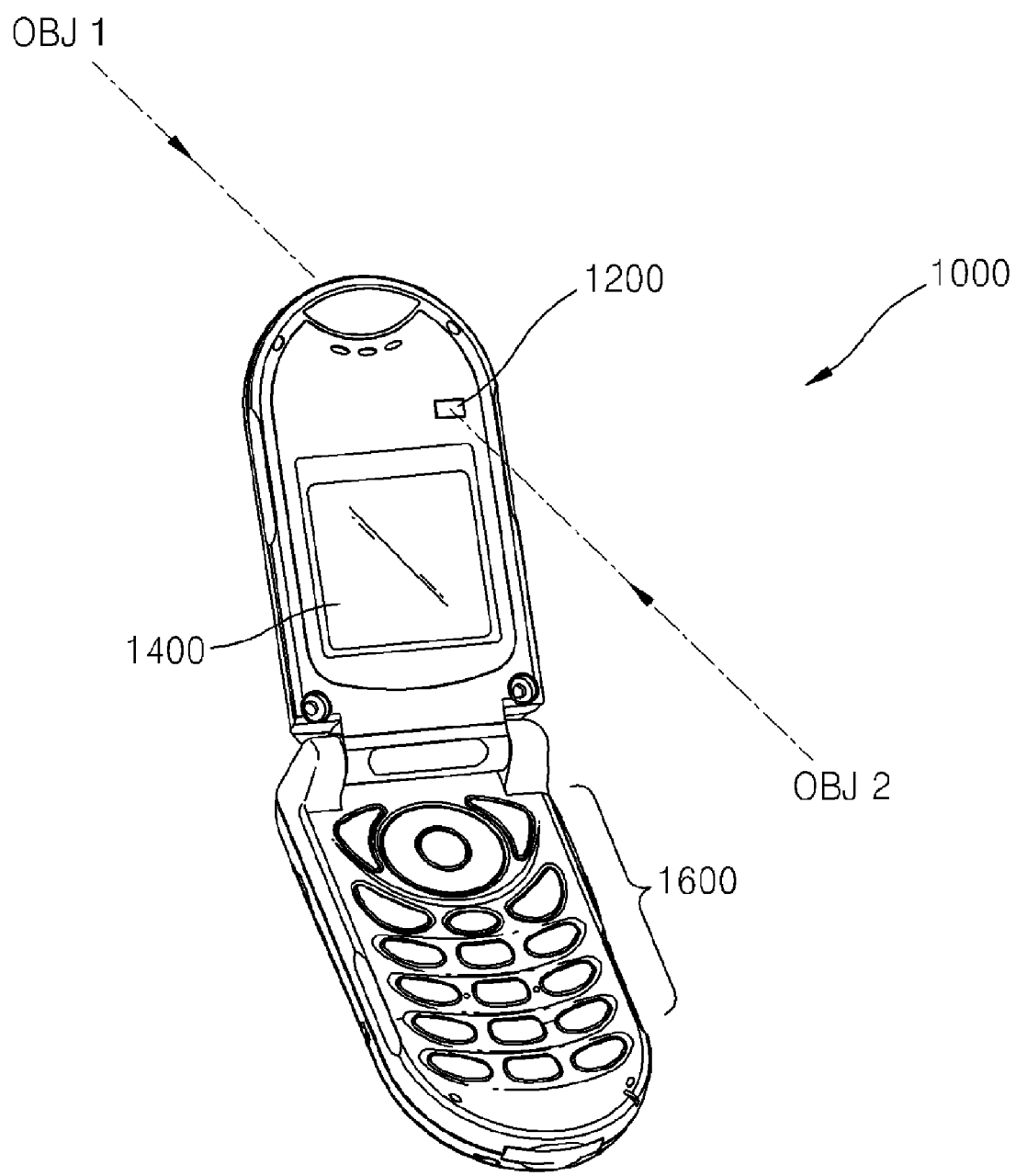
FIG. 12 schematically illustrates the structure of a mobile communications device employing a digital camera module according to an embodiment of the present invention.

FIG. 12 schematically illustrates the structure of a mobile communications device 1000 employing a digital camera module according to an embodiment of the present invention. The mobile communications device 1000 according to the present embodiment includes a digital camera module according to the embodiment of the present invention. The digital camera module includes an actuating unit (not shown) actuating a reflection member between the first and second optical modes in addition to the dual lens optical systems. The mobile communications device 1000 may include a mode selection unit (not shown) selecting any one of the first and second optical modes and an image processing unit (not shown) converting an electric signal from the photographing device 1 to an image signal for displaying the converted signal. The selection of a mode may be performed by an input through, for example, a button unit 1600. An image processed by the image processing unit may be displayed on a screen 1400 to be viewed by a user.

A cover glass 1200 may be installed on an interior surface of the mobile communications device 1000, that is, a surface where the screen 1400 is located. When any one of the dual lens optical systems of the above-described embodiments of FIGS. 1-10 is included in the mobile communications device 1000, the light indicating the image of an object is incident on the dual lens optical system through the cover glass 1200. Also, although it is not illustrated, a rear cover glass may be provided on the exterior surface of the mobile communications device 1000, that is, the rear surface of the screen 1400. In the dual lens optical systems of FIGS. 8-10, the image of any one of objects located at the opposite sides with respect to a photographing optical system may be selectively photographed without moving the photographing optical system. Thus, while viewing the screen 1400, the user may selectively photograph the object lights OBJ1 and OBJ2 located at the opposite sides of the screen 1400.

The mobile communications device 1000 of the present embodiment may be applied as, for example, mobile communications devices capable of making a video call and photographing a self image with a single camera module. That is, during a video call mode or a self photographing mode, the user may photograph the image of the user while viewing the image of a counterpart displayed on the screen 1400, by selecting, for example, the second optical mode. In a general photographing mode, for example, the first optical mode, the user may photograph the image of other object displayed on the screen 1400.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A dual lens optical system including a first optical system and a second optical system, comprising at least one reflection member to selectively redirect object lights in first and second directions toward a photographing device,
wherein the first optical system comprises, in order from an object to the photographing device along the optical axis:
a first lens group comprising a first reflection member;
a second lens group having a negative refractive power;
a third lens group having a positive refractive power;
a fourth lens group having a positive refractive power; and
a fifth lens group having a positive refractive power, and
wherein the second optical system shares at least one optical element with the first optical system.

2. The dual lens optical system of claim 1, wherein the first lens group has a positive refractive power.

3. The dual lens optical system of claim 1, wherein, during zooming from a wide mode to a tele mode, the first and third lens groups are fixed, the second lens group is moved toward the photographing device, and the fourth and fifth lens groups are moved toward the object.

4. The dual lens optical system of claim 1, wherein the at least one optical element is at least one optical element of the first lens group, the second lens group, the third lens group, the fourth lens group, the fifth lens group, and the photographing device of the first optical system and, in the second optical system, the object light in the second direction is redirected by the first reflection member toward the photographing device.

5. The dual lens optical system of claim 4, wherein the first reflection member comprises a first surface and a second surface opposing each other and the first and second directions are opposite to each other on the same axis, and wherein the first reflection member, at a first position, redirects the object light in the first direction toward the photographing device at the first surface and blocks the object light in the second direction at the second surface and, at a second position, redirects the object light in the second direction toward the photographing device at the first surface and blocks the object light in the first direction at the second surface, and the first reflection member is movable between the first position and the second position.

6. The dual lens optical system of claim 1, wherein the second optical system comprises a second reflection member that redirects the object light in the second direction toward the photographing device.

7. The dual lens optical system of claim 6, wherein the at least one optical element is the third lens group, the fourth lens group, the fifth lens group, and the photographing device of the first optical system, and the second optical system comprises the second reflection member that redirects the object light in the second direction toward the photographing device.

8. The dual lens optical system of claim 7, wherein the second optical system comprises, in order from the object to the photographing device along an optical axis:
   the second reflection member;
   the first lens group comprising the third lens group of the first optical system;
   the second lens group having a positive refractive power of the first optical system; and
   the third lens group having a positive refractive power of the first optical system.

9. The dual lens optical system of claim 8, wherein the first lens group has a negative refractive power.

10. The dual lens optical system of claim 8, wherein the first and second directions are in correspondingly opposite.

11. The dual lens optical system of claim 8, wherein the first and second directions face in correspondingly same directions.

12. The dual lens optical system of claim 8, wherein the second reflection member is selectively moved between a third position and a fourth position to allow object light incident in the second direction to be formed on the photographing device.

13. The dual lens optical system of claim 12, further comprising a lens cover that is movably arranged in front of the first lens group of the second optical system,
   wherein, at the third position, the object light incident in the second direction is blocked by the lens cover and object light incident in the first direction is redirected by the first reflection member and formed on the photographing device and, at the fourth position, the object light incident in the second direction is redirected by a first surface of the second reflection member to be formed on the photographing device and the object light incident in the first direction is blocked by a second surface of the second reflection member.

14. The dual lens optical system of claim 12, wherein, at the third position, the object light incident in the second direction is blocked by a second surface of the second reflection member and the object light incident in the first direction is redirected by the first reflection member and formed on the photographing device and, at the fourth position, the object light incident in the second direction is redirected by a first surface of the second reflection member to be formed on the photographing device and the object light incident in the first direction is blocked by the second surface of the second reflection member.

15. The dual lens optical system of claim 1, wherein the first and second optical systems share at least one lens group for auto focusing (AF).

16. A digital camera module comprising the first optical system and the second optical system of claim 1, wherein the first optical system is used for a general photographing mode and the second optical system is used for a self image photographing mode or a video call mode.

* * * * *